June 2, 1931.　　　　G. G. EARL　　　　1,808,211
FLUID METER
Original Filed March 1, 1928　　3 Sheets-Sheet 1
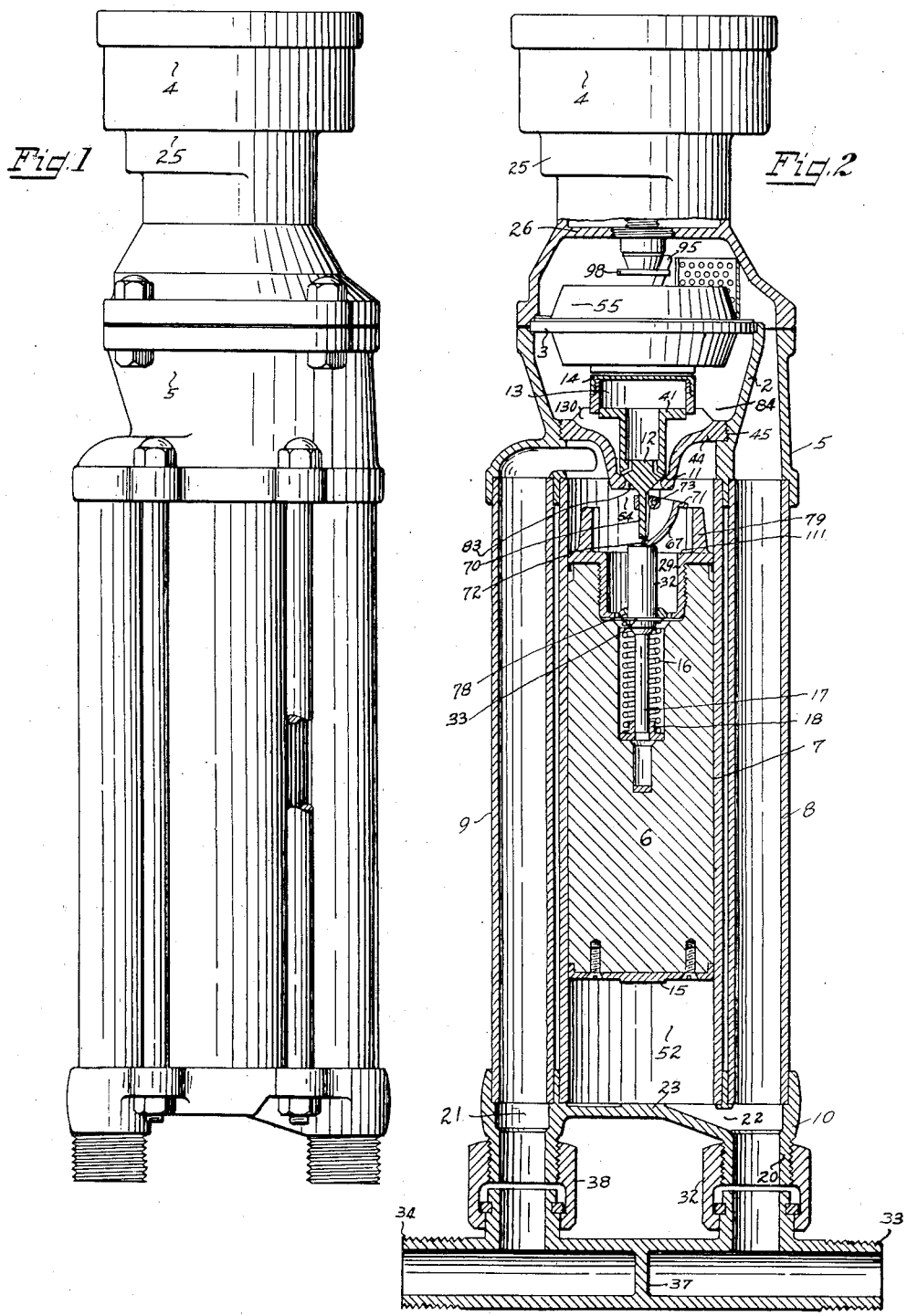
Inventor
George Gordell Earl
by Frank M. Slough
his attorney

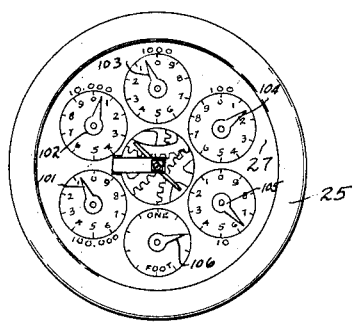
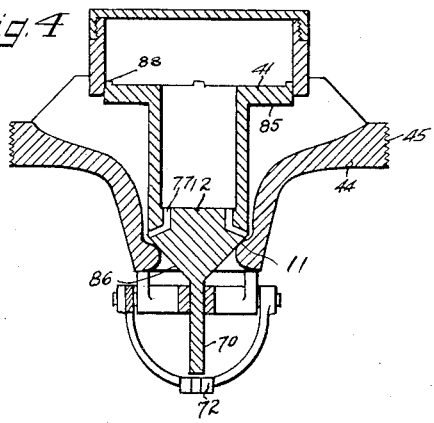
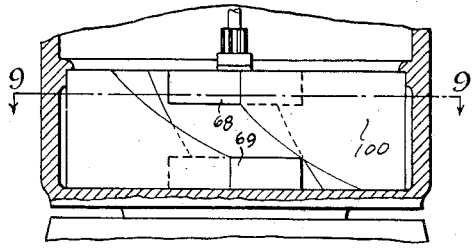
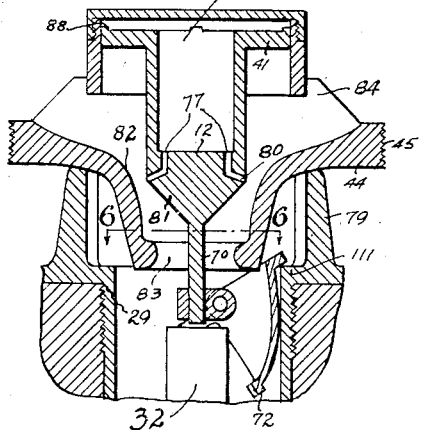
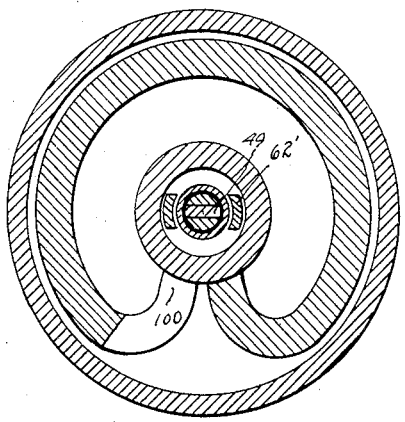
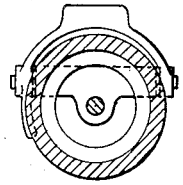
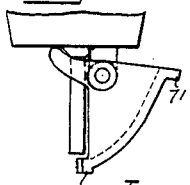

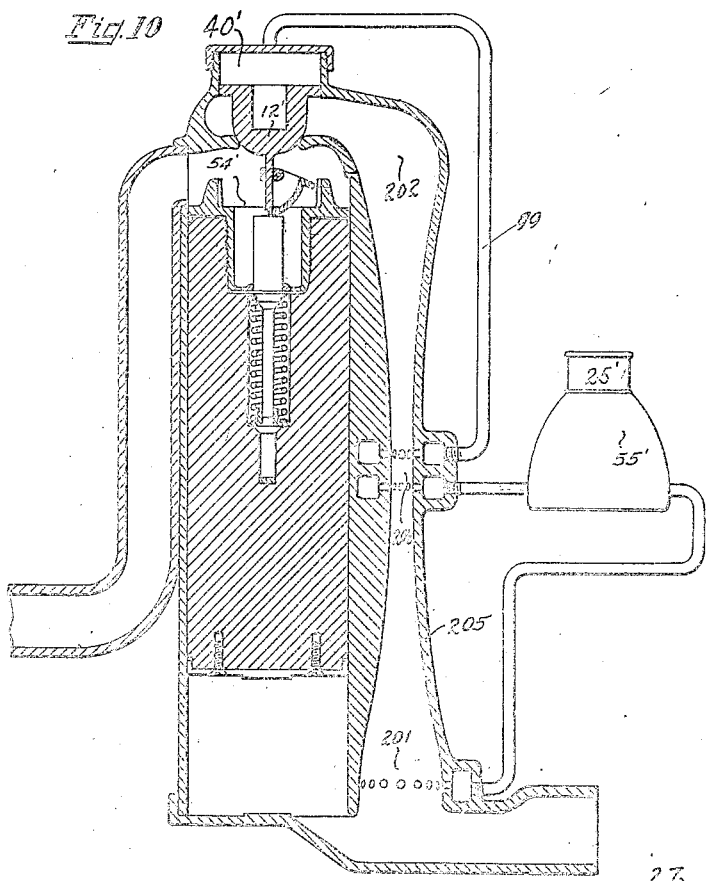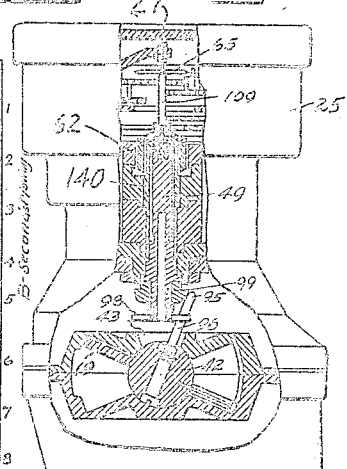

Patented June 2, 1931

1,808,211

UNITED STATES PATENT OFFICE

GEORGE GOODELL EARL, OF NEW ORLEANS, LOUISIANA

FLUID METER

Application filed March 1, 1928, Serial No. 258,339. Renewed April 13, 1931.

My invention relates generally to mechanisms and methods for fluid systems.

Broadly expressed, one of the objects of this invention is to provide for the control of flow in a fluid system by the operation of a valve, caused to positively open at a predetermined difference of pressure exerted by the fluid at its two sides, to effect maintenance of the valve opening condition so long as flow continually occurs through the open valve at above a predetermined rate of flow.

Another object of my invention is to provide for the achievement of the foregoing object and in addition to effect the positive restoration of the closed condition of the valve whenever the rate of flow of fluid through the opened valve becomes less than a predetermined rate of flow.

Relative to the above objects, it is an object of my invention to avoid all irregular actions of the valve which are familiar to those skilled in the art, and known under the adjective terms "chattering", "fluttering", and the like.

Another object is to accomplish quiet operation of a valve of the type above referred to.

Another object of my invention is to accomplish the opening of a valve, in a fluid system, by a predetermined variation in static fluid pressures on its two sides, and to control the period of open condition, after an initial opening, by the effect of differences of fluid pressure set up at spaced points in the passageway through which the resulting flow occurs, and commensurable with the rate of flow therethrough.

Another object of my invention is to provide for the accurate measurement of fluid flow over a wide range of rates of fluid flow.

Another object is to provide for ready testing of the accuracy and operability of improved apparatus, provided for measurement of fluid flow occurring at varying rates.

Another object is to provide for the measurement of flows occurring over a very wide range of rates of drafts through the apparatus as a whole by the measurement of flows occurring over a very small range of rates of flow through the metering element to accomplish uniformity of percentage of registered flow to actual flow.

Another object of my invention is to register accurately the whole flow of a fluid through a range of rates of draft from infinitesimal drips to capacity rate through the meter.

Another object of my invention is to increase the accuracy of registration of fluid flow occurring at low rates which in prior mechanisms, with which I am familiar, are either entirely unregistered or, if registered, are registered inaccurately or incompletely.

Another object of my invention is to provide for quickly and accurately testing the meter either in place or upon removal from the service.

Another object of my invention is to provide an improved form of meter wherein the operating characteristics of the meter and its accuracy of measurement may be accurately determined by observation of the meter without the necessity of employing extraneous testing devices.

Another object of my invention is to provide a novel apparatus and method of readily checking the accuracy of registration of water flows effected by the mechanism of my invention.

Another object is to provide a practically operative fluid flow controlling structure of the character described.

Another object of my invention is to provide for controlling a fluid flow in an improved manner.

Another object of my invention is to provide such arrangement of parts in a meter as to insure that when very low and ordinarily immeasurable flows occur, such as might result from leaks or very low consumption demand, that such flows shall not pass the meter in a continuous flow dependent on such leakage or low rate demand but shall occur at periodic intervals of time, starting under such difference of pressure on the two sides of the meter as to impart a very decided impact impulse to the disc or rotor in the measuring chamber, said impact impulse being adequate to cause the disc or rotor to move suddenly and positively, also to overcome the ordinary tendency of the disc or rotor to stick, and the same tendency to stick accentuated by the resistance caused by foreign particles lodging between the disc or rotor and the walls of the measuring chamber.

Another object of my invention is to provide a meter of an improved type wherein a minimum of mechanical resistance to fluid flow or a variation thereof is required to operate the metering element.

Another object of my invention is to provide a meter which may be used to accurately measure small flows which may be occurring at very low rates, under practically negligible head or difference of pressure.

Another object of my invention is to provide an improved meter, adapted to efficiently measure a minor flow substantially proportional at all times to a major flow, that is, for use as a proportional flow meter.

Another object is to provide an improved meter of the gulper type hereinafter defined and dsecribed which will operate practically noiselessly.

Other objects of my invention and the invention itself will become apparent as the following description of a particular embodiment of my invention progresses and in which description reference will be had to the accompanying drawings forming a part of this specification.

In the drawings:

Fig. 1 shows a front elevational view of an embodiment of my invention;

Fig. 2 shows a view mostly in medial vertical transverse section of the embodiment of Fig. 1, with coupling intake and discharge means attached thereto;

Fig. 3 illustrates a top plan view of a registering dial.

Fig. 4 illustrates in medial transverse vertical section, a valve, the valve seat therefor, and a guard for the valve;

Fig. 5 illustrates in like view the valve seat and support with the valve in a relatively elevated opened position, together with a valve controlling piston employed in the foregoing embodiment, the valve being illustrated in closed position;

Fig. 6 is a view taken on the line 6—6 of the apparatus illustrated in Fig. 5;

Fig. 7 is a side elevational view of the bottom end of the apparatus illustrated in Fig. 4;

Fig. 8 is a view, mostly in side elevation, of certain electro-magnetic clutch mechanism employed in the said embodiment;

Fig. 9 is a section taken on the line 9—9 of Fig. 8;

Fig. 10 illustrates diagrammatically, mostly as if in longitudinal medial transverse section, the embodiment of my invention operating in combinatio. with a venturi, to register proportional flows;

Fig. 11 illustrates largely in medial vertical section, the register actuator and a fragment of the registering mechanism actuated thereby responsive to fluid flow through the actuator;

Fig. 12 is a chart illustrating graphically quantitative characteristics observable from a relationship of the time idle and time active in the operation of the registering mechanism under certain conditions of use.

In the above drawings I have illustrated a mechanism which embodies my invention, the embodiment, illustrated, comprising various instrumentalities cooperating to effect measurement of the amount of fluid supplied thru the mechanism and which supplied fluid may occur at rates of flow too low to accurately be registered by known commercial registers, which at the same time are adaptable to register the amount of fluid required to be withdrawn, at relatively much higher rates.

The mechanism generally comprises a storage chamber for fluid stored therein under pressure sufficient to force it to the fluid supply system disposed on the discharge side of the meter, and a valve mechanism, controlling, in a manner later herein to be more specifically described, the admission at a relatively high rate, of fluid to the storage chamber whenever necessity for replenishing the supply of fluid therein occurs.

Associated with the mechanism as above referred to, I provide a registering mechanism placed in the path of the replenishing flows through the valve, and which will indicate: first, the passage of replenishing flows; second, the intervals wherein no replenishing flows occur; and third, the additive registration of the volume of flow passing through the valve from time to time.

By virtue of this arrangement, a registering mechanism which will efficiently operate to accurately register only fluid flows occuring at a relatively high rate, may just as efficiently and accurately be used in a system wherefrom drafts of fluid may be taken at exceedingly low rates of flow, and will positively, and accurately indicate the amount of flow so withdrawn.

The drawings illustrate a mechanism particularly adaptable to be used for water meters and in the embodiment illustrated, there is disclosed, as will be hereinafter more specifically described, an improved form of valve mechanism which may effect fluid flows through the passage and to discontinue such flows under certain conditions of use hereinafter more specifically described, in a very positive manner and without any irregular "chattering" effects either upon closing or opening movements of the valve.

Referring now, first, to the embodiment illustrated in Figs. 1 to 9 inclusive, I show therein a meter mechanism comprising a cylinder 7, within which a reciprocable piston 6 is disposed, secured in position between a lower end casing element 10, and an upper end casing element 5. A pair of oppositely disposed pipes 8 and 9 are disposed parallel to and laterally adjacent the cylinder 7. The upper casing element supports at its top a register box casing 25, having an intermediate bored web 26, and is provided at its top with a glass cover plate 27. Between the glass cover plate 27 and the web 26, a register mechanism is provided, portions of which will be hereinafter more specifically described, actuatable by a nutating disk mechanism contained in the box 55, which is supported within the upper portion of the casing element 5. An arcuate web 2 is provided within the casing 5 joining with the lateral walls of the casing in such a way as to provide a circular seat for the peripheral supporting flange 3 of the nutating disk box.

Nutating disk actuators for meter registers, as of the type illustrated, are very well known and require no detailed description. The register actuating rod, whose end 95 is illustrated as projecting above the box 55, is moved by passage of fluid through the box, commensurably with its volume, in a circular path to drive the wheel 98, to communicate motion to the meter register mechanism, contained in the register chamber 4.

A valve holder 44 is screw threaded at 45 against a shoulder in the lower part of the valve casing element 5, within the web 2. The valve holder 44 comprises a valve seat 11 for a valve 12, the holder flaring outwardly and upwardly from the seat terminating in the flanged peripheral portion exteriorally threaded at 45. The holder also comprises a cylinder 13 integrally supported by spaced webs 130. The cylinder is closed at its upper end by a cap 14, and is adapted to receive a hollow flanged piston 41 integrally supported upon the valve 12. The piston comprises a flanged head making bearing contact at its sides with the walls of the cylinder, and has a plurality of stops 88 adapted to engage the top of the cap.

The piston 6 comprises a heavy body, which may comprise lead or other heavy material, and is provided at its bottom end with a spacing projection 15 engageable with the upwardly extending projection 23 on the bottom end wall of the cylinder.

The piston is provided, at its upper end, with a stepped recess having an elongated portion of relatively small diameter adapted to receive a helical compression spring 16, the stem 17 for the kicker rod 32 being telescoped therein. The end of the stem is received within a stationary guide 18 secured within its lower end, the upper end of the recess being enlarged and faced with a metallic cup-shaped plate 29 screw threaded within the upper recess portion.

The plate 29 provides also at 78, a guide for the enlarged end of the kicker rod 32, which is telescopable into the portion of the recess containing the spring 16, under certain conditions of use as later herein described. The rod 32 carries an enlarged collar 33, engageable with the under surface of the guide 78, to limit the upward movement of the rod 32. The cup-shaped plate 29 is provided with spaced upstanding stop lugs 79, engageable with the under surface of the valve holder, to limit upward movement of the piston.

A valve seat for the valve is provided by an inturned flange of the enclosing valve holder, whose inner surface is formed to flare upwardly therefrom, curvilinearly, to its threaded peripheral border, preferably, substantially as illustrated.

The piston kicker rod 32 is axially aligned with the valve stem 70 so as to lift the valve, to effect flow of fluid through the valve port thereby provided.

A guard 67 is pivotally suspended from the holder 44, with its lower end 72 normally so depending below its pivot 73 and below the end of the valve stem 70, that, upon upward movement of the piston 6, the enlarged end of the kicker rod will first engage the end of the guard, effecting compression of the spring 16, storing energy therein, until, finally, the shoulder 111 of the piston face plate 29, effects engagement with the upper laterally extending flange 71 of the guard.

Such engagement will rock the guard on its pivot 73, causing the lower end of the guard to move laterally out of engagement with the kicker rod, suddenly releasing it. By virtue of the stored pressure of the spring 16, the released rod is caused to snap upwardly into forcible engagement with the bottom end of the valve stem, effecting a positive initial opening movement of the valve 12, upon a substantially complete upward movement of the piston.

The valve is thus opened by a "snap action" effected by a preliminary compression of the spring 16 and a "snap" or trigger release of the kicker rod occurs, which is caused to deliver a hammer blow to the valve rod, which ultimately may reach the position shown in Fig. 5 wherein, also, the ultimate upward position of the kicker rod 32 is indicated.

In order to effectively accomplish the further effect of maintaining the valve opened so long as is desirable, reliance is placed upon another instrumentality, whose effect depends upon the velocity of flow through the valve. To convey a ready understanding of the principle involved, it may be generally stated that, for instance, when fluid is passed through a Venturi passageway, such as that illustrated in Fig. 10 at 205, having a restricted throat 206, at a given velocity, the ascertainable pressure exerted at the approach and discharge ends 201 and 202, respectively, will be greater than the pressure exerted at the throat 206 where the passed fluid is compelled to flow at a relatively more rapid rate. In such a case, the decrease in pressure at the throat is generally termed the "loss of head" relative to the approach pressure 201, and is said to be substantially "recoverable" at 202.

Resuming the description of the embodiment of Figs. 1 to 9 inclusive, a condition exists therein, in simulation of the Venturi effects of pressure above related, this being had by properly forming the opposing surfaces of the passageway above the valve port, and which comprise the inner surfaces of the valve holder 44, and the opposing exterior surfaces of the valve element 12, to provide for all opened positions of the valve, a throat portion of the passageway 82 of increased restrictive effect to the flow of fluid which proceeds downwardly therethrough and through the valve port 83 as later more fully described. Such restriction in the passageway 82 effects a so-called "loss of head" or decrease in fluid pressure relative to the fluid pressures exerted at the approach 84 or the discharge port 83. This restriction is had adjacent the annular waist portion 80 of the valve element disposed between the inverted conical valve base 81, and the hollow cylindrical trunk of the piston 41, regardless of the longitudinal adjusted position taken by the valve.

The pressure existing at the throat restriction, resulting from the "loss of head" effected thereby, is communicated by the plurality of laterally spaced, annularly disposed passages 77 through the lateral walls of the hollow valve element to the space 40, within and above the piston 41, and is effective against all upper surfaces of the valve and piston.

At the same time, assuming a velocity flow passing through the restriction in the passageway, the pressure exerted on the under surfaces 85 and 86 of the piston and valve base, respectively, will be at relatively higher values of pressure, according to the rate of flow, and corresponding, in general, to those pressures existing at the approach and discharge portions of a Venturi passageway, such as that illustrated, for instance, at 205 in Fig. 10, relative to its throat pressure.

By virtue of this arrangement, whenever flow at a sufficient velocity is passed through the valve port, the valve element 12 will receive a lifting effort resulting from the pressure on its under side surfaces which form walls of the approach and discharge portions of the passageway, in excess of that lesser pressure communicated, from the intermediate most restricted portions of the passageway, to upper surfaces of the valve element comprising the piston 41. The valve element will therefore rise against the counter effect of its weight to an upper position, such as that illustrated in Fig. 5, and will be maintained in such an upper position during the continuance of lifting effort. Spacing projections 88, carried by the valve piston 41, prevent actual contact between other portions of the top surface thereof, and the cap 14.

The apparatus illustrated in Figs. 1 to 9 is operated as follows:

The weighted piston 6 is exposed on its bottom surface to the pressure of the fluid approaching the meter and valve, thru approach passageway 22, from which flow can only reach the outlet 21 by way of the pipe 8, the meter box 55, and the valve port 83 which may be closed, by the weight of the valve element comprising the valve 12, and by any difference of pressure on the upper and lower surfaces of said valve element.

When a demand for water occurs on the outlet side of the mechanism, the pressure in the storage chamber 54 is lowered by the withdrawal of water, while the approach pressure acting under the piston 6, in chamber 52, lifts said piston. The piston rises and when it attains the position shown therefor in Fig. 2, the upper end of the rod 32 contacts the trigger abutment 72 of the guard 67, and compresses the spring 16 and continues so to do until engagement is had between the shoulder 111 of the piston plate 29 and the upper flange 71 of the guard which rotates on its pivots 73, removing the guard abutment, against which the rod 32 is spring-pressed, out of the path of the rod.

Thereby, at a definite point in the piston stroke, the spring-pressed kicker rod 32 is released, and engages the depending valve stem 70 to lift it, a sufficient surplus of energy stored in said spring, being thereupon effective to rapidly open the valve 12 to a sufficiently wide open position.

Flow then passes rapidly through the valve port and meter box 55, and first completely refills the reservoir chamber, and second, supplies whatever draft of fluid may be in effect. The piston 6 is of considerable weight, such as something over 11¼ pounds, and will fall whenever the excess of pressure on its under side over that exerted on its upper side is less than the weight of the piston, that is, less than a total force of 11¼ pounds. For instance, where the diameters of the area of the upper and lower faces of the piston are each about 4.82 square inches, whenever the excess of pressure on the under side of the piston is substantially less than 11.25 divided by 4.82, or approximately 2.6 pounds per square inch, the piston will return to its lowermost position. However, the valve may remain opened, independently of the position of the piston. A definite and constant amount of fluid is required to refill the reservoir, and effects lowering of the reservoir piston, where-upon the support effected by the kicker rod, previously effective to hold the valve open, is withdrawn, and the valve will descend to that position whereat the pressure reduction effective at the restriction adjacent the annular surface 80, and communicated to the interior of the valve piston chamber 40, and due to the velocity of flow passing the passage openings 77, just overbalances the force tending to close the valve.

To illustrate the action of this valve, the valve piston element 12 and 41, having a total larger transverse surface area at its lower sides, than the transverse area of the valve opening, comprises a piston portion 41 reciprocable, freely, in the cylinder 13. When the valve is closed, the pressure on the approach side of the valve freely communicated through the passages 77 to the space above the valve and piston, is equal to the pressure of fluid exerted upon the under surfaces of the piston and valve, which are exposed to the pressure of fluid on the approach side of the valve; the valve is, therefore, closed due to its own weight plus a slight excess of pressure on its upper surfaces because of the generally existing lower fluid pressure acting on the under surface portion of the valve which is exposed to the pressure of fluid in the storage chamber.

Sometime after the valve is opened, the support therefor, comprising the rod 32, tending to hold it open, is withdrawn by recession of the piston 6, consequent to the partial refilling of the reservoir, the further position of the valve above its port opening will depend entirely upon the rate of flow passing the valve.

The openings at 80, at the lower ends of passages 77, will move upwardly or downwardly with the rise or fall of the valve 12, seeking that position whereat the velocity of flow passing them is such as to cause such a reduction of pressure that when communicated to the chamber 40, above the piston 41, it will be just low enough to effect a balance of the forces tending to close the valve and the forces tending to open it.

The pressure of fluid acting immediately under the exposed flanged portion of piston 41 will be that due to a relatively low rate of flow, the pressure at 80, when the valve takes any position above closed position, will be that due to a materially higher rate of flow, and consequently the rate of flow of fluid which is passing the entrances to passages 77 in the balanced position will be just the rate necessary to effect sustaining of the valve in such position; as the rate of flow progressively decreases, the valve will progressively fall towards positions progressively nearer and nearer to the final lowermost position wherein the valve is closed.

The depression into which the valve moves for closure may approach the substantially cylindrical form, as illustrated in Fig. 5, giving a short length of annular space of nearly uniform area through which the openings must pass before the valve can close, and so formed that the annular space at the time adjacent the surface 80 is of smallest area when the valve is in lowermost position.

At each position of the valve above closed position, a definite rate and velocity of flow past said annular valve surface 80 will suspast said valve in that position, and a higher rate will lift the valve to a more elevated position while a sufficiently lower rate will permit the valve to seat itself quietly.

The depression into which the annular apertured surface 80 of the valve advances when the valve is moving toward closed position, may be made of such length and progressively varied in cross-sectional area as to effect an annular transverse cross-sectional area around the valve element waist surface 80, so great, in the wide open position of the valve, at capacity rate, that the rate of flow past said waist surface will be very much less than the velocity passing the valve opening, although for the purposes of the present embodiment, a form of depression of cylindrical form in its lowermost portion, is preferred.

Preferably, the velocity past the entrances to passages 77, will dominate the position of the valve until the frictional effects of the passages through the register and other passageways, is enough so to reduce the pressure in the reservoir chamber that the reservoir piston will assume the reservoir empty position, after which the spring-pressed kicker rod 32 carried by the piston 6, will hold the valve in a wide open position for any higher rates of draft. In this embodiment the point in the passageway connected with the valve at which the velocity of flow dominates the position of the valves lies in the annular space adjacent the annular surface 80.

In Fig. 2 I have shown a coupling comprising in one piece an inlet part 33 and an outlet part 34 for connection to the inlet and outlet pipes of the system, separated by a web 37 and joined by coupling fittings 32 and 38 to the inlet and outlet portions 20 and 21 of the meter casing base 10. This enables the meter to be readily connected to the inlet and outlet pipes extending in a straight line relative to each other as usually provided, and at the same time to take the thrust upon the coupling element which may be exerted by the coupling arms usually provided to clamp the inlet and outlet conduits to a meter and without distortion of the other parts of the meter casing such as the cylinder 7.

In Fig. 10 I illustrate an embodiment of my invention employing the principle of a proportional flow meter wherein a register mechanism 55', receiving only a fractional part of the replenishing flow to the storage reservoir 54', is effective to proportionally indicate the amount of fluid flow passing the mechanism. This is accomplished by the provision of the Venturi passage 205 having a throat 206, and the respective approach and discharge portions 201 and 202 previously mentioned.

In Fig. 10, the valve, and piston and piston chamber as shown, are similar to the same parts above described for the embodiment of Figs. 1 to 9 inclusive, except that in this case the passages 77 and the depression into which the valve must seat to close, are not necessary to be provided. Instead of this the reduction of pressure near the throat 206 of a Venturi restriction due to the velocity of flow therethrough, is the effective "point in the passageway" connected with the valve at which the velocity of flow dominates its position.

In this embodiment, obviously the velocity, if enough to sustain the valve, will keep it wide open and if not enough, will permit the valve to close, quietly. This is true because following the restriction 206, where the velocity of flow passing causes a reduction of pressure from that at 201, there is provided an efficient form of passageway for the "recovery" of a large portion of such velocity head as exists at 206, which recovered pressure acts under the portion of the valve piston 12', which is exposed thereto by the communicating duct 99, leading from the throat 206 to the space 40' above the valve piston 12'. This form of valve can therefore be employed, although, obviously, the other form illustrated in Fig. 5, having passages 77 with the openings entering the depression of decreasing area leading to the valve, could be employed if desired in the present embodiment.

In the embodiment of Fig. 10 it will be apparent that the Venturi passage 205 supplies fluid to the approach side of the valve in a manner similar to that of the pipe 8 and meter passages of the foregoing embodiment, and in accordance with well known principles, that the amount of such flow occurring in "gulps" through the Venturi passage, will be proportionally had in similar volume through the registering chamber 55', which corresponds to the register box 55 of the first embodiment and which contains in its upper portion, a register mechanism casing 25' like that shown in the preceding embodiment at 25.

In the embodiment of Fig. 10, the entire flow is controlled by the valve 12' and the storage chamber 54' is effective to store and supply fluid between "gulping" periods, and while the valve 12' is in closed position, for all demands for flow, insufficient to empty the storage chamber.

Referring now more particularly to the register mechanism in Figs. 3, 8, 9 and 11, there is illustrated certain details of construction in such a register mechanism as I prefer to employ in combination with the other previously described instrumentalities. The register mechanism comprises the register actuator contained within a box 55 comprising a nutatable disk 19 rigidly secured to a ball 42 journaled in the upper and lower walls of the box, the upper wall of which is provided with an opening 43 through which an actuator rod 96 projects.

The movable rod 96 by an interposed arm of the wheel 98 rotates a small vertical cylindrical shaft 99 in water which penetrates through the shaft bearing; the shaft 99 contacts nothing save water and its own bearings, and the member 95, which turns it synchronously with its own motion; buried within an enlarged upper end of this shaft is a small vane form armature 49 of magnetic metal, such as soft iron, which acts as an armature of a magnet 100, and which armature extends axially up into a thin-walled inverted cup 140 of non-magnetic material, there being a very small clearance between the inner walls of the cup and the shaft.

Around this thin cup shaped container, a forked armature 62 comprising fork vanes 62' of magnetic material, such as soft iron, acting as a companion armature of the same magnet. These vanes revolve in an annular space, also of small clearance, and responsive to and synchronously with, the first named armature. The force to keep the armature, which revolves in water, in axial alignment with the companion armature, is supplied by the fixed permanent magnet 100, which terminates in annular positive and negative poles 68 and 69, spaced longitudinally and coaxially aligned, one above the other, and separated by non-magnetic material.

Carried by the support for the companion armature vane 62', is a pinion gear, which actuates the intermediate and clock train of the meter, and which is disposed directly on a central shaft 109, upon the upper end of which is carried a visible "test hand" 65. This hand necessarily moves synchronously with the driving and driven armatures, all substantially as described in the patents of Edwin H. Ford, 1,724,272 and 1,724,873, of August 13, 1929. Everything above the armature 49 revolving in water, is in a case 25, which is preferably hermetically sealed, gas and water tight.

The various register hands 101 to 106, inclusive, to additively register the amount of flows passing the meter are actuated by the clock train in the usual manner.

Several of the major causes of mechanical resistance and especially of variation in mechanical resistance, and several of the principal causes for which meters have to be taken out for repair as well, are thereby eliminated as follows: intermediate gear working in water or oil or both, all glands or stuffing boxes, the necessity to vent the clock case, which results in fogging, in blackened dials, in broken glasses and stuck clock gearing, broken hands, defaced dials, etc., erratic and indeterminate frictional resistance.

With no stuffing box, and with intermediate gear, clock train and dials and other parts, sealed in dry air, lighter intermediate gearing can be used and far less, varying, mechanical resistance or friction will be found. When a meter of this type is protected against small rates of flow by a gulper valve and reservoir, the last and one of the worst sources of mechanical resistance is eliminated. Variations of resistance otherwise incidental to the very close fitting of the nutatable disc which is essential to approximate accuracy of registration by ordinary meters, down to reasonably low rates of flow, is not required.

Instead a much freer fitting disk or other meter movable member can be used, with the result that very small expansion due to changes in temperature or growth of rubber or obstruction due to fine suspended particles in the water, will not create the amount of, or variation of, mechanical resistance which these causes must create with closer fitting meter movable members.

By the combination of the registering mechanism having the test hand movable at such a rate that its movement is readily observable at all rates within the range of "gulping" rates of flow, with the "gulper" meter mechanism as described, ready testing of the meter for accuracy and proper action may be had.

Fig. 12 is a chart illustrating graphically the relations which may be determined of time, movements of the test hand and volume of flow supplied to the system under conditions of various low discharge rates of draft from the meter mechanism to the system.

Such a chart as this may be prepared as follows:

First, measure, very carefully, the amount of water which passes at any low rate of draft while the test hand is idle. Assume this measurement is 16.215 cubic inches, this is the reservoir displacement. Second, draw a flow through the meter at a rate of around 1½ gallons per minute at which rate the valve remains open and the test hand will move slowly enough to permit of counting its revolutions. At this rate count the number of revolutions made by the test hand for the passage of, say, one cubic foot of water, assume this count to be 356 revolutions per cubic foot. 1,728 cubic inches per cubic foot divided by 356 revolutions gives 4.854 cubic inches discharged through meter per revolution of test hand, and 16.215 divided by 4.854 equals 3.34 revolutions of test hand to fill reservoir.

From the above data we can calculate and prepare a tabulation and diagram from which the meter can be tested in place by the simple expedient of timing the "time idle" and the "time moving" of the test hand and noting its terminal position before and after each motion for any small constant rate of gulping flow which may be in effect.

With the circle in which the test hand moves graduated to tenths, the terminal position of the test hand can be read closely to the nearest hundredth, and its revolutions during motion can be counted, although the careful noting of its terminal positions is all that is generally necessary.

Assuming the above conditions, the following tabulation gives in column A, certain assumed "time idle" of test hand, and in column B corresponding assumed "time moving" of said hand.

Column C gives the rate of draft in effect resulting from the observed time of "hand idle" during which the reservoir was being emptied. When the hand is moving it must register not only the quantity required to refill the reservoir, but also the quantity resulting from the rate of draft in effect while the reservoir is being filled; i. e., while the hand is moving, column D shows the cubic inches which must be added to the reservoir displacement on account of the rate of draft which is in effect while the reservoir is filling.

Column E shows the sum of the reservoir displacement of 16.215 cubic inches and the amount in column E or the total number of cubic inches of water which the test hand must register and column F is the result of dividing the amount which the test hand must register as shown in column E by 4.854 cubic inches which it registers for each revolution, or the number of revolutions which the test hand must make.

| A | B | C | D | E | F |
|---|---|---|---|---|---|
| Test hand seconds | | Cu. ins. per sec. rate of flow in effect | Cu. ins. of draft while hand moves | Cu. ins. which test hand must register | Revolutions of test hand to register Col. E |
| Idle | Moving | | | | |
| 160 | 1.8 | 0.1 | 0.18 | 16.395 | 3.38 |
| 80 | 1.8 | 0.2 | 0.36 | 16.575 | 3.41 |
| 40 | 2.0 | 0.405 | 0.81 | 17.025 | 3.51 |
| 20 | 2.4 | 0.81 | 1.944 | 18.159 | 3.74 |
| 10 | 3.0 | 1.621 | 3.890 | 20.105 | 4.14 |
| 5 | 4.0 | 3.243 | 9.729 | 25.944 | 5.34 |
| 4 | 6.0 | 4.0504 | 24.3024 | 40.517 | 8.34 |

By plotting the above into a chart, Fig. 12, by observation of the number of revolutions of the test hand, a check of the "time moving" for any given "time idle" may be readily had for all meters of a given type and size.

If the "time idle" is, say, 80 seconds, the test hand should move 3.41 revolutions per gulp. If its terminal position was, say 0.47 at the start of a gulp it should be 0.47 plus 3.41 equals 3.88 at the end of the first gulp and 3.88 plus 3.41 equals 7.29 at the end of the second gulp, etc., usually the 3 and 7 can be taken for granted, the .47 and .88 and .29 of terminal figures which can be carefully read and recorded with ample time, are the meat of the test which lies in said terminal figures.

Close timing of "time moving" on the lower ranges of gulping draft does not greatly matter and the actual variation in said time will be insignificant; tests should be made preferably on such lower rates. As the "time idle" decreases, and the "time moving" increases, the latter becomes a more and more important factor and is more apt to vary slightly from the times upon which any diagram is based. "Time moving", as assumed, should be shown on the diagram if such time is found to vary from the "time moving" as shown on diagram, it will obviously be necessary at the higher rates of gulping flow to recalculate the motion of the test hand to correspond with the "time idle" and the "time moving" which is actually encountered if the test is attempted at said higher rates of gulping flow.

The constant waste leakage flow going unregistered into consumer's houses should seldom much exceed the above assumed rate of 1/20th of a gallon per minute and will often be materially less; usually such leakage will be a satisfactory basis for such a test, but if it is too low, in any case, a sufficient additional drip can be made at any faucet to produce such a constant waste. In any case the occupant of the premises should be asked not to draw any water during the few moments necessary to make such a test.

Made on any "time idle" rate of test hand of 80 seconds or more such a test can be made in 10 minutes, with the meter in place, based on a water flow which is not even seen and which only amounts to a fraction of a gallon, and will be just as accurate and conclusive for a meter of this type, as any series of tests which can be made by removing a meter to a testing plant and spending hours of time and a large amount of water for its testing. Such a test with the meter in place, will show the leakage on the premises in effect at the time of the test, and that all of it is being registered. The necessity of ever removing an efficient meter for test, as is now commonly done at very great unnecessary expenditure, because there is no way of telling what constant waste may be in effect, or at what low rate the existing meter will fail to register, is avoided.

Having thus described my invention,—first, in an embodiment illustrating a meter which may be put in place to register, for instance, all drafts of flow occurring within a residence, or other consuming point of a water system; and second, in an embodiment adaptable for use for measuring the drafts of flow occurring at a larger rate and which may be accurately registered by a "gulper" meter mechanism of the type described, by associating the registering mechanism with a Venturi passageway so as to by-pass a minor substantially proportional flow through the registering mechanism, the entire flow, however, being controlled by a "gulper" valve substantially as described,—I am aware that numerous and extensive departures may be made from the embodiments herein illustrated and described for the purpose of illustrating certain uses of my invention but which come within the spirit of my invention.

I claim as my invention:

1. In combination, a casing having a passage therethrough adapted to conduct a flow of fluid, a register, a register actuator and a valve, said valve controlling the flow through the passage, said actuator adapted to effect operation of the register at a rate corresponding to the rate of flow through the passage, means operable to effect opening of said valve responsive to an excess of pressure at the inlet end of the passage over that at the outlet end thereof, and other means dominated by the rate of flow through the passage responsive to an initial opening of the valve, adapted to effect continuous opening of the valve, substantially only for such a period as a predetermined rate of flow through the passage is exceeded, and separate means operated coincidental with any substantial movement of the actuator, adapted to instantly indicate the fact of and continuance of flow through the passage.

2. In combination, a casing having a passage therethrough adapted to conduct a flow of fluid, a register, a register actuator and a valve, said valve controlling the flow through the passage, said actuator adapted to effect operation of the register at a rate corresponding to the rate of flow through the passage, means operable to effect opening of said valve responsive to an excess of pressure at the inlet end of the passage over that at the outlet end thereof, and other means dominated by the rate of flow through the passage responsive to an initial opening of the valve, adapted to effect continuous opening of the valve, substantially only for such a period as a predetermined rate of flow through the passage is exceeded, and separate means operated coincidental with any substantial movement of the actuator, adapted to instantly indicate the fact of and continuance of flow through the passage, said register adapted to additively register the total volume of flow occurring during any interval comprising a plurality of successive periods during each of which the valve is opened.

3. In combination, a casing having a passage therethrough adapted to conduct a flow of fluid, a register, a register actuator and a valve, said valve controlling the flow through the passage, said actuator adapted to effect operation of the register at a rate corresponding to the rate of flow through the passage, means operable to effect opening of said valve responsive to an excess of pressure at the inlet end of the passage over that at the outlet end thereof, and other means dominated by the rate of flow through the passage responsive to an initial opening of the valve, adapted to effect continuous opening of the valve, substantially only for such a period as a predetermined rate of flow through the passage is exceeded, and a visible element movable in response to actuation of said actuator, and whose rate of movement is such as to permit counting of the movements of the actuator during meter actuated periods.

4. In a water meter, a valve adapted to prevent small flows of water through the meter, a compartment in the meter adapted to contain a supply of water to supply water at small rates of draft, a movable member adapted to move responsive to the difference of pressures existing on its two sides, one of said pressures being derived from the water on the approach side of the valve, and the other pressure being derived from the water on the discharge side of the valve, and means operable by movements of said member to effect an initial opening of the valve whereby the supply of water in the compartment will be renewed, comprising a spring adapted to resiliently communicate the valve opening effort from the movable member to the valve, and an element adapted to restrain the communication of opening effort to the valve until the movable member has been moved a pre-determined amount effecting storage of potential energy in the spring, and releasing means for the restraining element, operable by the movable element, after a predetermined movement thereof.

5. In a water meter, a valve adapted to prevent small flows of water through the meter, a compartment in the meter adapted to contain a supply of water to supply water at small rates of draft, a movable member adapted to move responsive to the difference of pressures existing on its two sides, one of said pressures being derived from the water on the approach side of the valve, and the other pressure being derived from the water on the discharge side of the valve, and means operable by movements of said member to effect an initial opening of the valve whereby the supply of water in the compartment will be renewed, said means comprising an impact element and a spring, said movable member adapted to store energy in the spring during movement thereof, and means operative to effect a sudden actuation of the valve by the stored energy of the spring upon continued movement of the movable member.

6. In a water meter, a valve adapted to prevent small flows of water through the meter, a compartment in the meter adapted to contain a supply of water to supply water at small rates of draft, a movable member adapted to move responsive to the difference of pressures existing on its two sides, one of said pressures being derived from the water on the approach side of the valve, and the other pressure being derived from the water on the discharge side of the valve, and means operable by movements of said member to effect an initial opening of the valve whereby the supply of water in the compartment will be renewed, said means comprising a compressible spring, a plunger and a movable stop element, said plunger being adapted to be moved into engagement with said stop element and said spring being adapted to be compressed upon a partial movement of said movable member, and said stop element being movable by said movable member upon a further movement thereof to permit said plunger to be propelled by the spring to open the valve.

7. In a water meter, in combination a valve adapted to prevent small flows of water through the meter, a compartment in the meter adapted to contain a supply of water to supply water at small rates of draft, a movable member having a recess and adapted to move responsive to the difference of pressures existing on its two sides, one of said pressures being derived from the water on the approach side of the valve, and the other pressure being derived from the water on the discharge side of the valve, and means operable by movements of said member to effect an initial opening of the valve whereby the supply of water in the compartment will be renewed, said means comprising a compressible spring, a plunger and a movable stop element, said plunger being adapted to be moved into engagement with said stop element and said spring being adapted to be compressed upon a partial movement of said movable member, and said stop element being movable by said movable member upon a further movement thereof to permit said plunger to be propelled by the spring to open the valve, said spring and said plunger being at least largely disposable within the recess of the movable member.

8. In a meter adapted to register the amount water passed through it at varying rates including low rates of flow, a registering mechanism, means operable to supply water through the registering mechanism solely in gulps of flow at rates sufficiently high as to be accurately registerable, a reservoir to receive the gulped water and adapted to supply water continuously therefrom between gulps at unregisterable low rates of flow, said registering mechanism comprising a visible element movable in cycles at a rate proportional to the rate of flow occurring therethrough during gulping periods, and which may be readily visibly countable for each separate gulping period.

9. In combination with a meter of the

"gulper" type, a registering mechanism for registering the gulped flows, said registering mechanism comprising an element movable periodically at a rate proportional to the rate of gulped flow, and low enough to be counted and whose aggregate movement during a single gulping period is thereby rendered directly ascertainable, by noting the movement of said element accomplished during said single gulping period at the termination thereof.

10. A conduit comprising a passageway adapted to convey a fluid flow, a valve in said passageway, a pressure chamber including a reservoir to receive the discharge from the valve, said chamber having a reciprocating movable division, a connection from the approach side of said passageway to said pressure chamber on one side of said movable division, a connection from the discharge side of said passageway to the reservoir on the other side of said movable division, means to supply a fluid flow under pressure to the approach side of said passageway, means to withdraw varrying rates of draft from the discharge side of said reservoir, means to press the said movable division toward the said approach side connection to create an adequate difference of pressure across said movable division, means operable responsive to movement of the movable division to accumulate energy during movement of said division in the reservoir emptying direction, to open said valve, a stop preventing opening of the valve during the period of accumulation of energy by said means and adapted to be disabled at a definite point in the reservoir emptying stroke of the movable division to release said means to effect instant opening of said valve by virtue of the accumulated energy, means effected by the rate of flow through the valve to hold said valve open so long as said rate of flow exceeds a predetermined rate and to gradually seat said valve when said rate reduces to less than said predetermined rate.

11. A conduit comprising a passageway for fluid flow, a valve in said passageway, means operated by the difference of pressure across said passage to open said valve if a predetermined amount of difference of pressure is exceeded, and fluid pressure operated means dominated by the rate of flow through said passageway to hold said valve open as long as a predetermined rate of said flow is exceeded, said valve movable against the direction of the flow therethrough when moving toward open position, said passageway being gradually constricted proceeding in the direction of flow toward the valve port, and having a portion adjacent said valve port of substantially uniform cross-sectional area throughout its length.

12. A conduit comprising a passageway for fluid flow, a valve in said passageway, means operated by the difference of pressure across said passage to open said valve if a predetermined amount of difference of pressure is exceeded, and fluid pressure operated means dominated by the rate of flow through said passageway to hold said valve open as long as a predetermined rate of said flow is exceeded, said valve movable against the direction of the flow therethrough when moving toward open position, said passageway being gradually constricted proceeding in the direction of flow toward the valve port, said fluid pressure operated means comprising intermediately disposed relatively constricted passageway walls and conduit means to communicate the pressure effects of fluid within said constricted walls to the surfaces of the valve against which fluid pressure, tending to close the valve, could be exerted.

13. A conduit comprising a passageway adapted to convey a fluid flow, a valve in said passageway, means constantly exerting a substantially uniform effort tending to press the valve towards closed position, a pressure chamber having a reciprocating movable division, a connection from the approach side of said passageway to said pressure chamber on one side of said movable division, a connection from the discharge side of said passageway to the other side of said movable division, means to supply a fluid flow under pressure to the approach side of said passageway, means to withdraw varying rates of draft from the discharge side of said passageway, means to press the said movable division toward the said approach side connection to create an adequate difference of pressure across said movable division, means operated by said movable division to open said valve or to accumulate energy during its stroke in one direction and by sudden snap action at a definite point in the stroke to release said energy for the instant opening of said valve, independent means effected by the rate of flow through the valve to hold said valve open so long as said rate of flow exceeds a predetermined rate and to cushion said valve to its seat when said rate is less than said predetermined rate.

14. A conduit comprising a passageway for fluid flow, a valve in said passageway, weight means constantly exerting a substantially uniform effort tending to press the valve towards closed position, means operated by the difference of pressure across said passage to open said valve if a predetermined amount of difference of pressure is exceeded, and independent fluid pressure operated means dominated by the rate of flow through said passageway to hold said valve open as long as a predetermined rate of said flow is exceeded, said valve movable against the direction of the flow therethrough when moving toward open position, said passageway being gradually constricted proceeding in the direction of flow toward the valve port, and having a portion adjacent said valve port of substantially uniform cross-sectional area throughout its length.

In testimony whereof I hereunto affix my signature this third day of February, 1928.

GEORGE GOODELL EARL.